Nov. 29, 1955     H. C. WARD     2,725,200
FILM DRIVE AND CONTROL MECHANISM
Filed Oct. 18, 1951     4 Sheets-Sheet 1

INVENTOR.
HUGH C. WARD
BY
ATTORNEY.

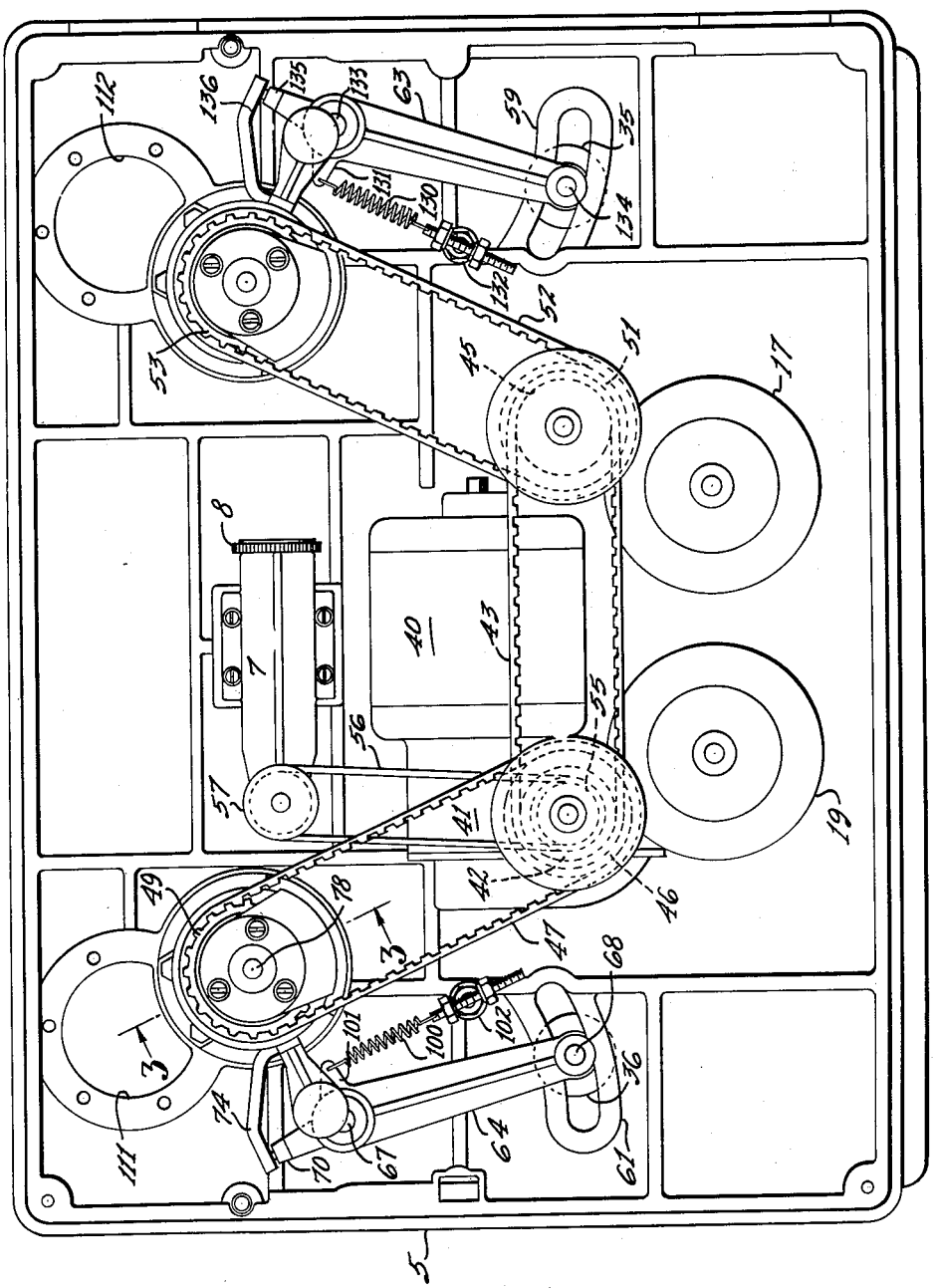

Nov. 29, 1955 H. C. WARD 2,725,200
FILM DRIVE AND CONTROL MECHANISM
Filed Oct. 18, 1951 4 Sheets-Sheet 3
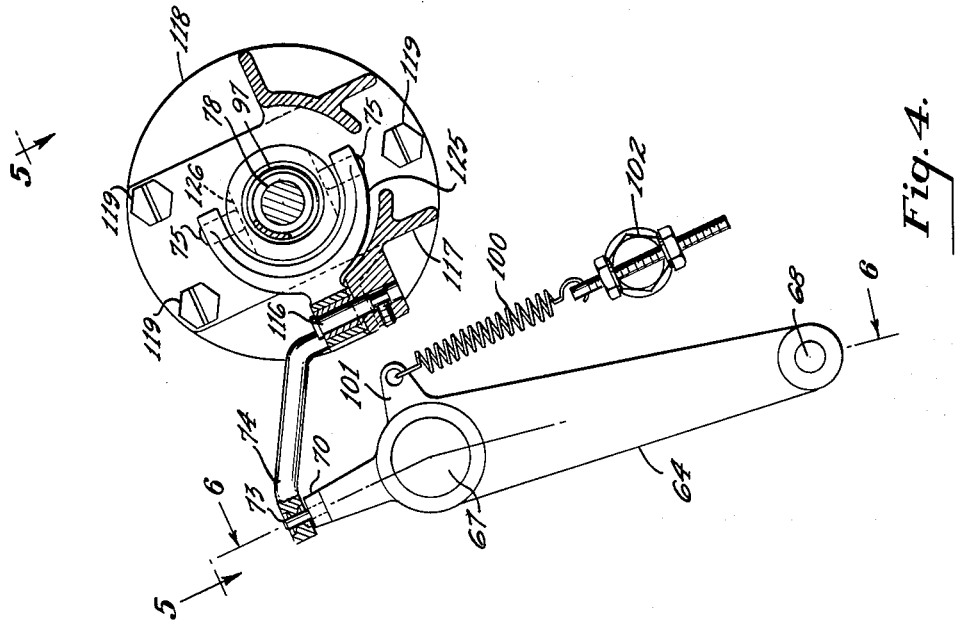
INVENTOR.
HUGH C. WARD
BY
ATTORNEY.

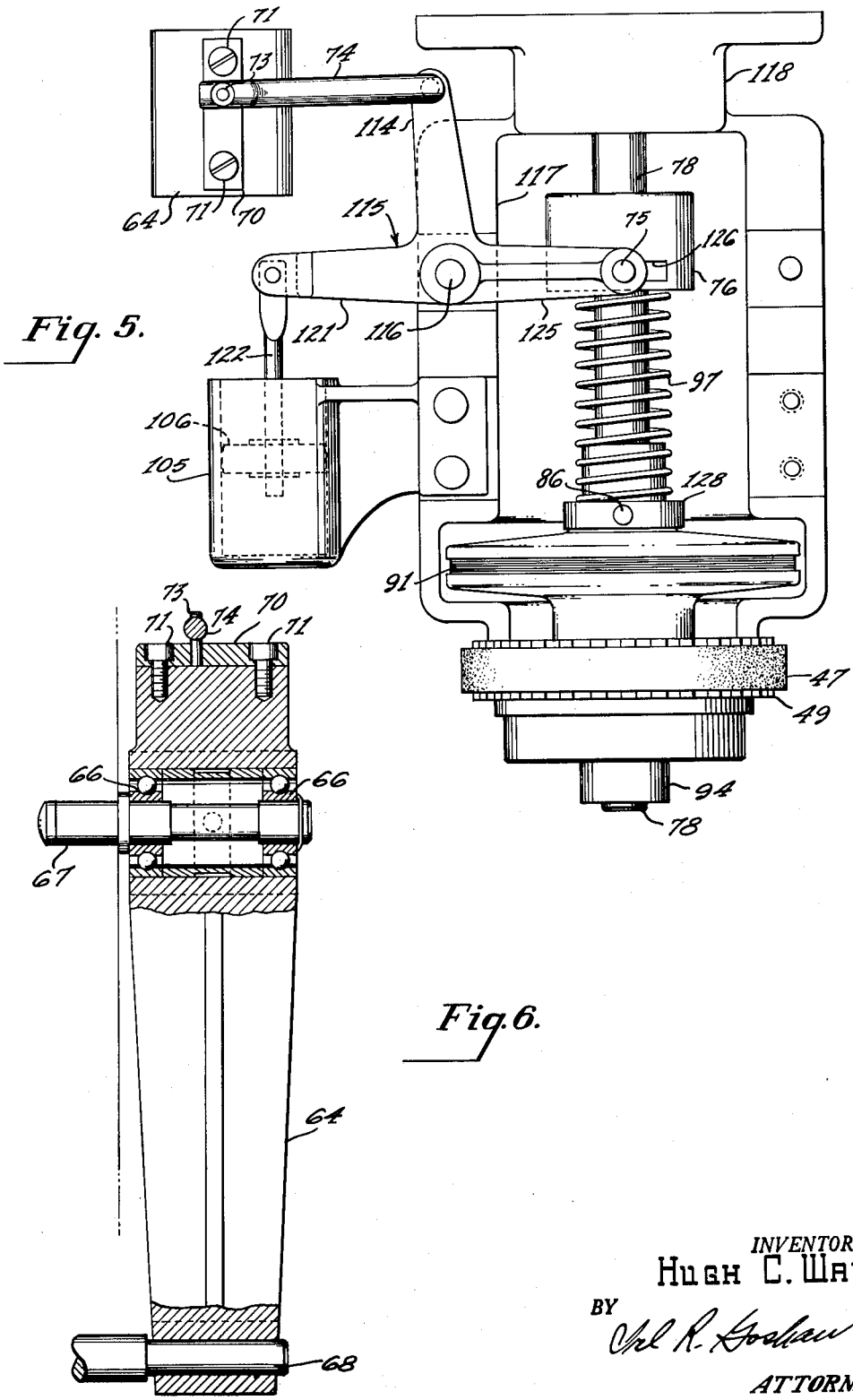

United States Patent Office 2,725,200
Patented Nov. 29, 1955

2,725,200

FILM DRIVE AND CONTROL MECHANISM

Hugh C. Ward, Los Angeles, Calif., assignor to Radio Corporation of America, a corporation of Delaware Application October 18, 1951, Serial No. 251,876

8 Claims. (Cl. 242—55)

This invention relates to film driving apparatus, and particularly to a portable magnetic sound recorder and reproducer having a film supply and take-up system in which a substantially constant tension is maintained in the film between the reels and the film advancing drums.

The basic film advancing path and film advancing elements of the present invention are disclosed and claimed in Ward and Pettus U. S. Patent No. 2,687,884 of August 31, 1954, while another type of film tension control system is disclosed and claimed in Hittle co-pending U. S. application, Ser. No. 251,370, filed October 15, 1951. The present invention is directed to a compact form of magnetic film drive suitable for portable equipment, since it utilizes the form of film drive disclosed in the above-mentioned patent to obtain uniform film motion and ease of threading, together with a new mechanical form of constant film tensioning system.

The present system utilizes a pair of sensing rollers between each film reel and the particular sprocket associated therewith, each roller controlling a frictional clutch mechanism adapted to be adjusted in accordance with the torque required to drive the take-up reel or to hold back the supply reel. Since the mechanism is primarily constructed to be portable, it is designed so that the supply and take-up reels may be included within the portable case or the reel drive mechanism may be repositioned to permit the use of larger reels. This is accomplished simply by reversing one element of the mechanisms and using driving belts of different lengths.

The principal object of the invention, therefore, is to facilitate the recording and reproducing of sound.

Another object of the invention is to provide an improved magnetic film or tape sound recorder and reproducer.

A further object of the invention is to provide an improved magnetic film drive in which a substantially constant tension is provided in the film from and to respective reels.

A still further object of the invention is to provide an improved sound recorder and reproducer which is suitable for various continuous recording times.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is a rear, elevational view of the driving mechanism of the invention.

Fig. 3 is a cross-sectional view of the adjustable clutch mechanism of the invention taken along the line 3—3 of Fig. 2.

Fig. 4 is a detailed view of the clutch control mechanism of the invention taken along the line 4—4 of Fig. 3.

Fig. 5 is a detailed view of the clutch for controlling the film tension taken along the line 5—5 of Fig. 4, and Fig. 6 is a detailed view, partly in cross-section, of the control arm of the invention and taken along the line 6—6 of Fig. 4.

Figure 1:
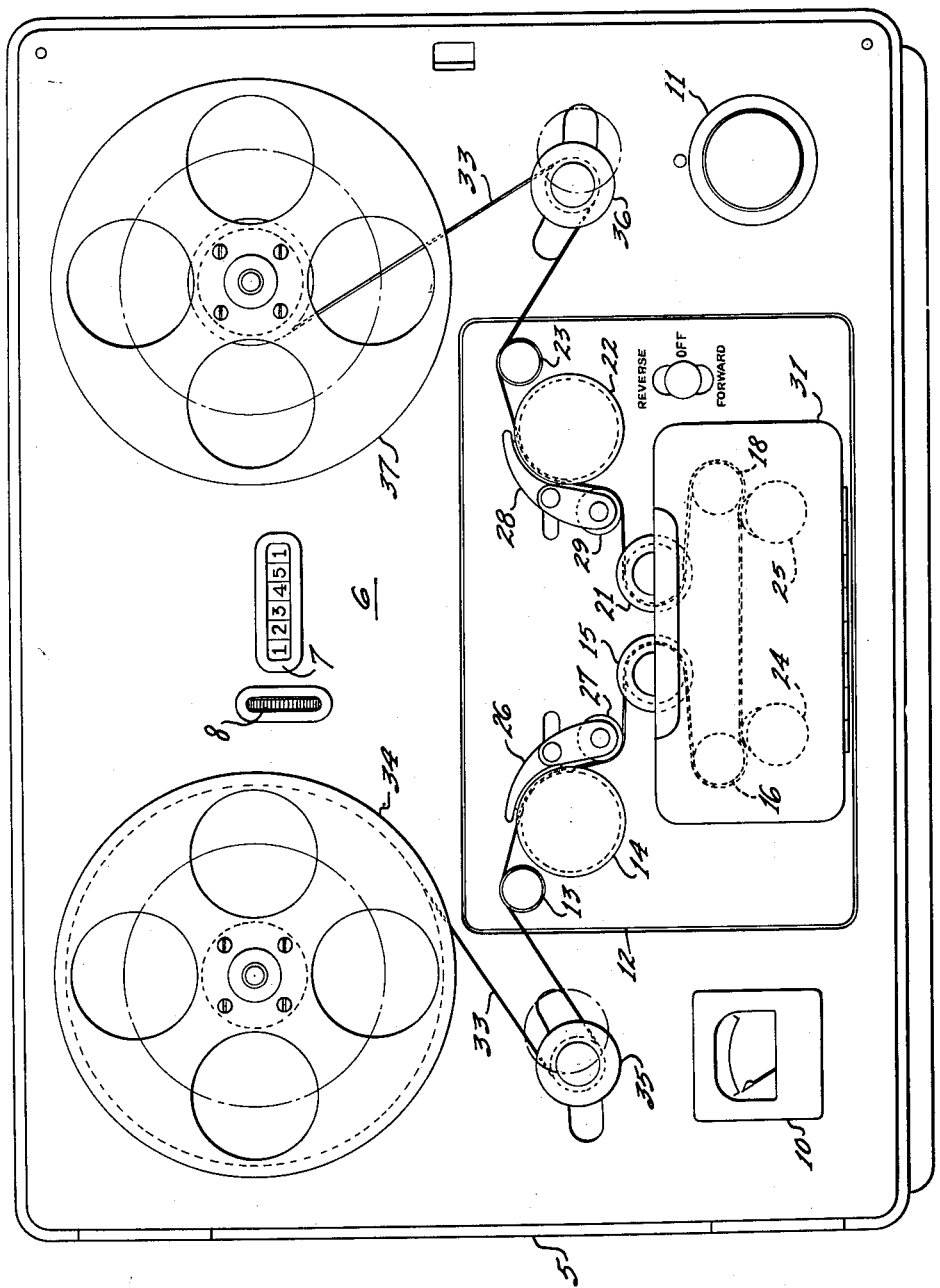
Fig. 1 is a front, elevational view of a sound recorder and reproducer embodying the invention.

Referring now to the drawings, in which the same numerals identify like elements, the recorder and reproducer unit is housed in a casing 5 and the elements thereof are mounted on a panel 6. Fig. 1 shows a footage counter dial 7 with its adjusting wheel 8, a bias meter 10, and an audio control switch 11. The drive mechanism is located on an insert panel 12, this mechanism being disclosed and claimed in the above-mentioned Ward and Pettus patent. In brief, this drive includes a guide roller 13, a sprocket 14, a tensioning roller 15, an inertia drum 16 having a flywheel 17 on the shaft thereof, an inertia roller 18 having a flywheel 19 on the shaft thereof, a tensioning roller 21, a sprocket 22, and a guide roller 23. The film is passed over magnetic heads 24 and 25, either of which may serve as a recording or reproducing head, depending upon the direction of film travel. The film passes over a small portion of sprocket 14 and is held thereon by a shoe 26 and guided by a roller 27. Similarly, the shoe 28 and roller 29 are associated with the sprocket 22. The heads 24 and 25 and the inertia drums 16 and 18 are within a mu metal shield 31. A film 33 is shown coming from a reel 34 around a sensing roller 35, and from sprocket 22 the film is shown passing around a sensing roller 36 to a reel 37. Since the film may travel in either direction, each reel may serve as either a supply or a take-up reel.

The reel drive of the portable recorder and reproducer is shown in Fig. 2, wherein a motor 40, through gear reduction box 41, drives a belt sprocket wheel 42, around which is a precision rubber cog belt 43, the belt also passing around a second belt sprocket wheel 45. The film sprocket 22 is driven by the shaft of belt sprocket wheel 42, and film sprocket 14 is driven by belt sprocket wheel 45. Mounted on the shaft of belt sprocket wheel 42, is a second belt sprocket wheel 46, around which is a rubber cog belt 47 passing around belt reel sprocket wheel 49. Mounted on the shaft of sprocket wheel 45, is a belt sprocket wheel 51, around which is a rubber cog belt 52 passing around a reel sprocket wheel 53. Thus, regardless of the direction of rotation of the motor 40, wheel 42 will be positively driven therewith along with the wheel 45 by the belt 43. However, the wheels 46, 49, 51, and 53 are mounted on overrunning clutches of the type shown in cross-section in Fig. 3, and the details and operation of which will be explained hereinafter.

Other elements of the drive are a pulley 55 which drives a belt 56 and a pulley 57 for the footage counter 7. The rear of the panel 6 is provided with partitioning ribs, two vertical partitions having arcuate curved slot members 59 and 61, in which the shafts of the sensing rollers 35 and 36 are movable. The shafts of these rollers are mounted on respective arms 63 and 64, one of which is shown in detail in Fig. 6. The arms are mounted on ball bearings, such as shown at 66, which are, in turn, mounted on shafts 67 and 133. The other ends of the arms have shafts 68 and 134 mounted therein, and on which the respective sensing rollers are mounted and are rotatable. The upper ends of the arms are provided with flat surfaces, to which are attached plates 70 and 135 by screws such as shown at 71, and in which are pins 73, to which are attached connecting rods 74 and 136. Referring to a single unit, both units being the same except in reverse position, the rod 74 connects with section 114 of a T-shaped arm 115, pivoted on a shaft 116 on bracket 117. Each bracket is attached by a flange such as shown at 118 to panel 6 by screws 119, and they are movable to openings 111 and 112 when larger reels are used.

The section 121 of arm 115 is connected to a rod 122 of a piston 106 in a dashpot 105. These dashpots tend to soften the shock of the sensing rollers when the rollers to move to their extreme positions in the arcuate slots in members 59 and 61 at the starting and stopping of the unit. The dashpot also keeps the sensing rollers from hunting by its stabilization effect. The section 125 of arm 115 is in the form of a yoke having pins 75 in the ends thereof, which are positioned in and move in slots 126 of a journal box 76 having a bearing 77 on shaft 78. The bearing permits a spring 97 to rotate.

In Fig. 3 is shown the reel 37 mounted and adapted to be driven by the shaft 78 through the sleeve 81 held in assembly by set screws 82 and 83. The sleeve 81 permits reels of different shaft lengths to be accommodated. The shaft 78 is mounted on bearings 84 and 95, and has keyed thereto a clutch plate 85. A collar 128 is attached to the hub of the plate 85 by a set screw 86 to permit adjusting the initial tension in spring 97. An opposing friction plate 88 is mounted for rotation on bearings 89, and has the sprocket wheel 49 pressed on the hub thereof so they rotate as a unit. Between the two clutch plates is a felt frictional washer or pad 91 attached to the face of plate 88.

An overrunning clutch mechanism is shown at 93 of any standard type, the elements being held in assembly by nut 94 on the end of shaft 78. The operation of the overrunning clutch is such that when the belt 47 rotates the wheel 49 in one direction to take up film on reel 37, the plate 88 is driven, which will drive the plate 85 through the friction pad 91, and thus, the shaft 78 and the reel 37. When the reel 37 is rotated in the opposite direction to supply film, there is a drag thereon provided by the friction between the pad 91 and face of plate 85, the amount of drag depending upon the tension in the spring 97, which is determined dynamically by the position of the yoke 125. The drag is obtained by the plate 88 being prevented from rotating by the overrunning clutch, since the wheel 49 is now locked to member 96, which, in turn, is held to the bracket 117 by screw 127. A certain predetermined tension is placed in the film loops by springs 100 and 130 connected in openings in extensions 101 and 131 and to adjustable anchor members 102 and 132.

The above described mechanism functions to provide a constant tension in the loop of film leaving the supply reel and the loop of film to the take-up reel regardless of direction of film motion. Assume, for purposes of explanation, that the film is passing from reel 34 to reel 37, which makes reel 37 the take-up reel driven by sprocket wheel 49. The motor is thus rotating in a direction whereby both sprocket wheels 42 and 45 are being driven to drive film sprockets 14 and 22, and the overrunning clutch of wheel 46 locks to drive belt 47 and the wheel 49. The wheel 49 drives the reel 37, as above described. The sensing roller 36 is normally adjusted by spring 100 to position it at the center of the slot member 61, and at this position, the minimum tension is placed in spring 97. As the film is taken up on reel 37, more pressure is needed between the pad 91 and plate 85 to provide the necessary torque on the reel 37. As the weight of the film reel, and thus, the load increases, there is a fractional amount of overslipping at the clutch pad, since the compression of spring 97 at a given instant is not sufficient to assure the taking up of the film. At this instant, the sensing roller 36, as shown in Fig. 1, moves to the right under the tension of the spring 100. This action moves the yoke 125 to the right, as shown in Fig. 3, increasing the tension in spring 97 and increasing the driving torque on the reel to the required amount. These minute impulses are continuous throughout the time required to exhaust the film through the unit.

Now, with respect to the supply reel 34, this reel is held back by the friction of the clutch pad corresponding to pad 91, since the sprocket wheel 53 will be locked to its bracket, as explained above. That is, a plate corresponding to plate 88 will be held stationary and a drag placed on the film leaving the reel 34. As the film roll decreases in diameter, a lesser amount of drag is required to maintain the same tension in the film, and this drag is reduced by the sensing roller 35 operating in the reverse direction to that explained for the take-up reel. The overrunning clutch of sprocket wheel 51 will permit this wheel to be held stationary during the rotation of sprocket wheel 45, so that the belt 52 and sprocket wheel 53 may be stationary.

Now, when the motor is reversed to advance the film from reel 37 to reel 34, the reverse action occurs, and the belt 47 is held stationary by the overrunning clutch 93, the clutch of wheel 46 permitting the wheel 46 to be held stationary.

As mentioned above, this portable recorder and reproducer unit may be operated entirely closed when certain sized reels, such as reels 34 and 37, are used. If larger reels are desired to increase the continuous recording time, the brackets, such as shown at 117, may be moved from their positions shown in Fig. 2 to the openings shown at 111 and 112 simply by reversing the members 74 and using longer belts 47 and 52.

I claim:

1. A film driving system comprising a motor, a sprocket driven by said motor, a supply reel, a take-up reel, film being adapted to be threaded along a predetermined path from said supply reel over said sprocket to said take-up reel, a roller for contacting the film at a point in said path between said take-up reel and said sprocket, a second roller for contacting said film at a point in said path between said supply reel and said sprocket, a pivoted arm for each of said rollers, a shaft keyed to said supply reel for driving said supply reel, a shaft keyed to said take-up reel for driving said take-up reel, individual means for connecting said motor to said shafts for alternately driving one of said shafts depending upon the direction of rotation of said motor, each of said means including a wheel rotatable in one direction only on each of said shafts, a clutch on each of said shafts, each clutch having a plate attached to its associated shaft and a plate attached to its associated wheel, the position of each of said respective rollers and arms determining the friction between said plates, and resilient means interconnecting each of said arms with each plate of said clutches attached to each of said shafts for controlling the friction between said plates in accordance with the tension in said film determining the position of said rollers.

2. A film driving system in accordance with claim 1, in which two sprockets are provided, one sprocket being adapted to feed film to said take-up reel and the other sprocket being adapted to draw film from said supply reel, interconnecting means between said motor and said sprockets for simultaneously driving said sprockets, and overrunning clutch mechanisms between said sprocket driving means and each of said reel shafts for driving said plate attached to said wheel when said motor rotates in one direction and holding said plate stationary when said motor rotates in the opposite direction.

3. A film driving system in accordance with claim 1, in which each of said individual means for connecting said motor to said reel shafts includes an overunning clutch mechanism between each of said shafts and said motor.

4. A reversible drive mechanism for supply and take-up reels for film advancing mechanisms comprising a pair of sprockets, a motor, means for connecting said motor to one of said sprockets to drive said last mentioned sprocket, means for interconnecting said driven sprocket with the other of said sprockets for advancing film over both of said sprockets simultaneously, a take-up reel having a shaft, a supply reel having a shaft, means interconnecting said sprockets and said shafts for driving one of said shafts when the reel of said shaft is a take-up reel and for releasing said supply reel shaft, means controlled by the film tension between said take-up reel and one of said sprockets for controlling the driving torque applied to said take-up reel shaft, and means controlled by the film tension between said supply reel and the other of said sprockets for controlling the drag applied to said supply reel shaft.

5. A reversible drive mechanism in accordance with claim 4, in which said means for interconnecting said sprockets includes a belt wheel on the shafts of each of said sprockets and an interconnecting belt therebetween, said means for interconnecting said sprockets and said reel shafts including a belt wheel on each of said sprocket shafts and respective shafts of said reels and respective interconnecting belts therebetween, and overrunning clutches for each of said belt wheels.

6. A reversible drive mechanism in accordance with claim 4, in which said torque and drag controlling means includes a pair of pivoted arms, rollers mounted on said arms, one roller being positioned to contact with film fed from said supply reel and the other roller being positioned to contact with film fed to said take-up reel, and driving clutches mounted on said reel shafts, movement of said arms caused by varying tensions in said film varying the friction applied to said clutches.

7. A film drive system comprising a pair of film advancing sprockets, shafts for said sprockets, motor means for driving one of said shafts, a wheel fixed on each of said shafts, a belt connecting said wheels, a second wheel on each of said shafts, means between each of said second wheels and its associated shaft for driving each of said second wheels in one direction only, a pair of film reels, a shaft for each of said film reels and keyed to said reels, a fixed bracket for each of said film reel shafts, a wheel on each of said film reel shafts, and belts for connecting one of said second wheels on one of said sprocket shafts to one of said reel shaft wheels and the other of said second wheels to the other of said reel shaft wheels.

8. A film drive system in accordance with claim 7, in which means are provided between each of said reel shaft wheels and its associated shaft for permitting rotation of each of said reel shaft wheels in one direction only.

References Cited in the file of this patent

UNITED STATES PATENTS

| | | |
|---|---|---|
| 1,216,084 | Dalberg | Feb. 13, 1917 |
| 1,629,029 | Garbutt | May 17, 1927 |
| 1,654,800 | Garbutt | Jan. 3, 1928 |
| 1,992,706 | Lira | Feb. 26, 1935 |
| 2,078,357 | Woodmansee et al. | Apr. 27, 1937 |
| 2,304,913 | Herzig | Dec. 15, 1942 |
| 2,325,885 | Serrurier | Aug. 3, 1943 |
| 2,401,982 | Springhorn | June 11, 1946 |
| 2,462,558 | Scheuermann et al. | Feb. 22, 1949 |
| 2,592,285 | Hutchinson, Jr. | Apr. 8, 1952 |
| 2,609,998 | Sear | Sept. 9, 1952 |

FOREIGN PATENTS

| | | |
|---|---|---|
| 139,202 | Germany | Oct. 25, 1934 |